United States Patent [19]

Nakajima et al.

[11] Patent Number: 4,965,230

[45] Date of Patent: Oct. 23, 1990

[54] ALUMINA POROUS BODY AND PRODUCTION OF THE SAME

[75] Inventors: Hirohito Nakajima; Takaaki Ito; Yukito Muraguchi, all of Tokoname, Japan

[73] Assignee: Inax Corporation, Tokoname, Japan

[21] Appl. No.: 317,720

[22] Filed: Mar. 2, 1989

[30] Foreign Application Priority Data

Mar. 2, 1988 [JP] Japan .................................. 63-49425
Dec. 26, 1988 [JP] Japan ................................ 63-330304

[51] Int. Cl.$^5$ ............................................ C04B 35/10
[52] U.S. Cl. ...................................... 501/128; 501/80
[58] Field of Search ................... 501/128, 80; 428/332

[56] References Cited

U.S. PATENT DOCUMENTS 4,595,665  6/1986  Takayama et al. ................. 501/128

Primary Examiner—Mark L. Bell
Assistant Examiner—Deborah Jones
Attorney, Agent, or Firm—Finnegan, Henderson, Farabow, Garrett & Dunner

[57] ABSTRACT

An alumina porous body which comprises coarse alumina particles as a filler and $SiO_2$, said alumina and $SiO_2$ forming an $Al_2O_3$-$SiO_2$ compound (mullite) on the surface of the coarse alumina particles through the reaction between them that takes place at the time of firing, said compound binding said coarse alumina particles, forming pores between them. The invention also relates to a process for producing an alumina porous body which comprises mixing coarse alumina particles with $SiO_2$, molding the mixture, and firing the molding at a temperature not higher than 1700° C., thereby sintering the coarse alumina particles.

13 Claims, 3 Drawing Sheets

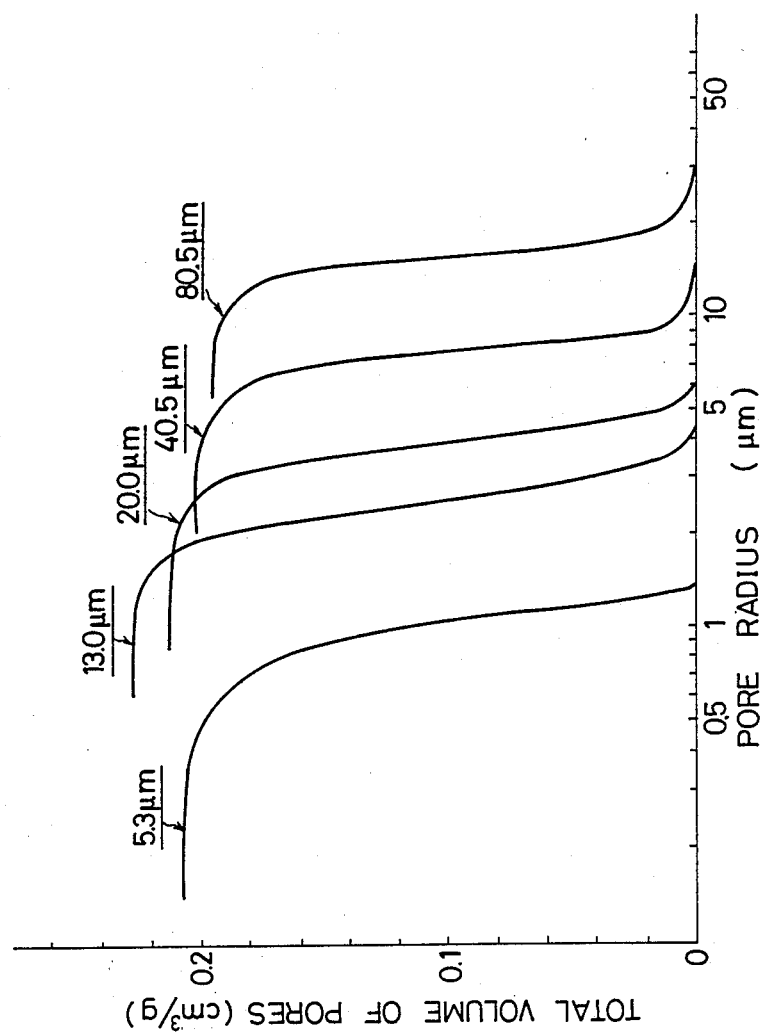

ALUMINA POROUS BODY AND PRODUCTION OF THE SAME

FIELD OF THE INVENTION AND RELATED ART STATEMENT

The present invention relates to an alumina porous body that can be used as a filter or a carrier for immobilized microorganisms and enzymes, and also to a process for producing the same.

The ceramics porous body to be used as a filter is required to have as high a porosity as possible and as uniform a pore diameter as possible so that it permits the medium to pass through with a minimum resistance.

According to the conventional process, this ceramics porous body is produced by mixing a filler (such as alumina $Al_2O_3$, titania $TiO_3$, silicon carbide SiC, and chamotte) of proper particle diameter and particle size distribution with a small amount of binder (such as clay) and vitreous flux, and firing the resulting mixture.

The binding of a filler needs none of or only a very small amount of vitreous flux in the case where the filler is composed of fine particles or the filler has a low refractoriness. In such a case, the particles of the filler readily sinter at the time of firing. This is not the case with a filler such as alumina having a high refractoriness or a filler composed of coarse particles. Particles of such a filler do not sinter easily. They have to be bound by the aid of a vitreous flux or by firing at a high temperature (above 2000° C.) at which the particles sinter. The porous body produced in this manner has a low porosity (due to the flux) or a high production cost (due to the high firing temperature).

OBJECT AND SUMMARY OF THE INVENTION

The present invention was completed to solve the above-mentioned problem involved in the prior art technology. It is an object of the present invention to provide an alumina porous body which has a high porosity and a high strength and can be produced at a low firing temperature and hence at a low production cost. It is another object of the present invention to provide a process for producing the alumina porous body.

The gist of the present invention resides in an alumina porous body which comprises coarse alumina particles as a filler and $SiO_2$, said alumina and $SiO_2$ forming an $Al_2O_3$-$SiO_2$ compound (mullite) on the surface of the coarse alumina particles through the reaction between them that takes place at the time of firing, said compound binding said coarse alumina particles, forming pores between them. According to the process of the present invention, the alumina porous body is produced by firing a mixture of coarse alumina particles (as a filler) and $SiO_2$ at a firing temperature not higher than 1700° C.

BRIEF DESCRIPTION OF THE DRAWINGS

FIG. 3 is a graph showing the pore size distribution of the fired bodies obtained in Examples 1 to 3.

DESCRIPTION OF THE PREFERRED EMBODIMENTS

The embodiments of the present invention will be described with reference to the accompanying drawings.

According to an embodiment of the present invention, the alumina porous body comprises coarse alumina particles as a filler and ultrafine silica particles (colloidal silica), said alumina and silica forming mullite ($3Al_2O_3 \cdot 2SiO_2$) on the surface of the coarse alumina particles through the reaction between them that takes place at the time of firing, said mullite binding said coarse alumina particles, forming pores between them. The alumina porous body is produced by firing a mixture of coarse alumina particles (as a filler) and ultrafine silica particles (colloidal silica) at a firing temperature not higher than 1700° C. The amount of the colloidal silica is so adjusted as to account for not more than 20 wt % of $Al_2O_3$.

According to another embodiment of the present invention, the alumina porous body comprises coarse alumina particles as a filler and silica stone powder, said alumina and silica stone powder forming mullite ($3Al_2O_3 \cdot 2SiO_2$) on the surface of the coarse alumina particles through the reaction between them that takes place at the time of firing, said mullite binding said coarse alumina particles, forming pores between them. The alumina porous body is produced by firing a mixture of coarse alumina particles (as a filler) and silica stone powder having an average particle diameter not greater than 5 $\mu$m at a firing temperature not higher than 1700° C.

After experiments with alumina having different particle diameters, the present inventors found that alumina particles are completely bound only when they are fired at 1700° C. or above if they have a particle diameter larger than about 6 $\mu$m. In the case of alumina having a particle diameter larger than about 10 $\mu$m, alumina particles sinter incompletely when fired at 1600° C., resulting in a weak fired body having a flexural strength lower than about 200 kgf/cm$^2$.

The present inventors continued their investigation in search of a method for binding coarse alumina particles firmly at a firing temperature not higher than 1700° C. and yet forming uniform pores without decreasing the porosity. As the result, it was found that if coarse alumina particles (as a filler) are incorporated with silica stone powder (containing more than 99% of $SiO_2$) or ultrafine silica particles (colloidal silica), the coarse alumina particles are firmly bound by mullite ($3Al_2O_3 \cdot 2SiO_2$) which is formed on the surface of the coarse alumina particles at the time of firing.

Figure 1:
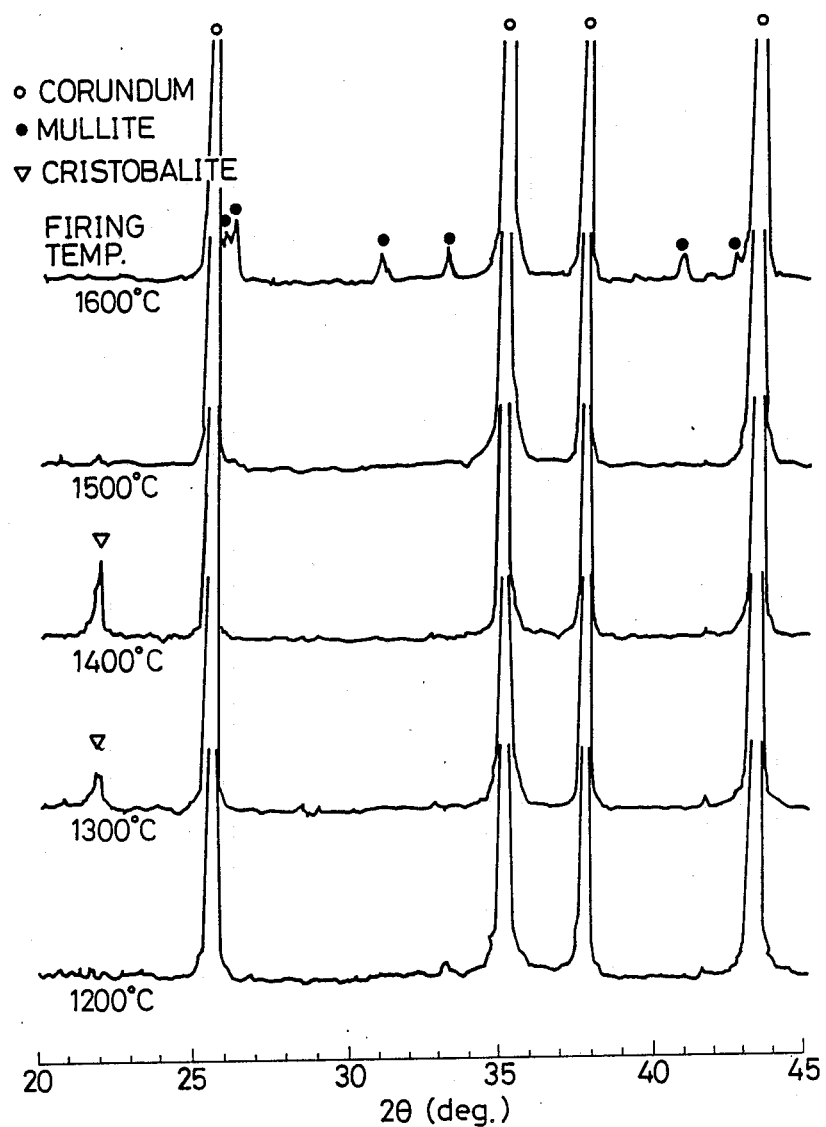
FIG. 1 shows powder X-ray diffraction patterns indicating the temperature at which mullite is formed in the mixture of 90 parts by weight of alumina filler (240 mesh, with an average particle diameter of 80.5 $\mu$m) and 10 parts by weight of silica stone powder or ultrafine silica particles.

FIG. 1 shows powder X-ray diffraction patterns of a mixture of 90 parts by weight of alumina filler (with a particle diameter of about 80 $\mu$m) and 10 parts by weight of silica stone powder (containing more than 99% of $SiO_2$) or ultrafine silica particles (colloidal silica).

It is noted from FIG. 1 that the silica stone powder or colloidal silica added to the alumina filler changes into cristobalite when the firing is carried out at about 1300° C., whereas it reacts with the alumina filler, forming mullite on the surface thereof, if the firing temperature is raised to 1600° C.

The fired body obtained by firing at 1600° C. has a flexural strength of 400 kgf/cm$^2$, a porosity of 45%, and an average particle diameter of 36 $\mu$m.

Figure 2:
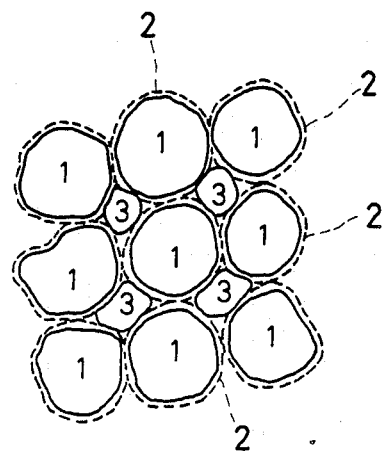
FIG. 2 is a schematic diagram showing the internal structure of the fired body.

FIG. 2 schematically shows the internal structure of the fired body in which mullite is formed. It is noted that the fired body is composed of the alumina particles (filler) 1 and the mullite 2 formed on the surface thereof, with the former being firmly bound by the latter, and the pores formed between the alumina particles 1.

Tests for the amount of the silica stone powder or ultrafine silica particles (colloidal silica) to be added to the alumina indicate that the firm binding of alumina particles is achieved if it is not more than 20 wt %, preferably 3 wt % to 20 wt %, (in terms of $SiO_2$) of $Al_2O_3$. Incidentally, the silica stone powder should have an average particle diameter not greater than 5 $\mu$m, preferably 1 to 5 $\mu$m.

The firm binding of alumina particles is achieved at a firing temperature not higher than 1700° C., preferably from 1600° to 1650° C. The coarse alumina particles as a filler should have an average particle diameter of 3 to 85 $\mu$m, preferably 5 to 85 $\mu$m, so that they form a fired body having an average pore diameter larger than 2 $\mu$m and a porosity not smaller than 40%, preferably 40 to 45%.

The alumina porous body of the present invention is formed by incorporating coarse alumina particles as a filler with ultrafine silica particles or silica stone powder as an $SiO_2$ source, and firing the resulting mixture at a comparatively low temperature. The firing causes the coarse alumina particles to react with the ultrafine silica particles or silica stone powder, forming mullite on the surface of the former. The mullite firmly binds the coarse alumina particles to one another. For this reason, it is possible to bind the coarse alumina particles at a comparatively low temperature and to form uniform pores between the coarse alumina particles. Thus, the process of the present invention does not need a high firing temperature for the binding of coarse alumina particles unlike the conventional process. In addition, it provides a porous body having a high bond strength without using a large amount of flux even in the case where the coarse alumina particles have a large particle diameter. It also provides an alumina porous body having a high porosity and uniform pores.

According to the process of the present invention, the alumina porous body can be produced at a low production cost because firing can be achieved at a low temperature not higher than 1700° C. on account of the addition of $SiO_2$ which contributes to the high mechanical strength of the alumina porous body.

According to the process of the present invention, it is possible to produce the alumina porous body having a high strength and high porosity at a low production cost on account of the ultrafine silica particles (colloidal silica) or silica stone powder as an $SiO_2$ source added to the coarse alumina particles as a filler.

The alumina porous body may be provided with pores of desired diameter if the particle diameter of the coarse alumina particles is adequately selected. The alumina porous body having a proper pore diameter will find use as not only filters but also carriers for immobilized microorganisms and enzymes. The one having an extremely small pore diameter will find use as a support of an ultrafilter membrane.

The invention will be described in more detail with reference to the following examples.

Example 1

The following four components were mixed using a mixing machine and the resulting mixture was extruded into a pipe 20 mm in diameter and 3 mm thick.
- 90 parts by weight of white electrofused alumina containing more than 99% of $Al_2O_3$ and having a particle size of 240 mesh and an average particle diameter of 80.5 $\mu$m, made by Nikkei Kako Co., Ltd.
- 10 parts by weight of aerosil containing more than 99.8% of $SiO_2$ and having an average particle diameter of 7 $\mu$m, made by Nippon Aerosil Co., Ltd.
- 30 parts by weight of water.
- 12 parts by weight of "Cerander" (binder) made by Yuken Kogyo Co., Ltd.

The pipe was heated to 1600° C. at a rate of about 5° C./minute and fired at 1600° C. for 1 hour. The fired pipe was allowed to cool to room temperature.

The fired pipe was found to have an average pore diameter of 36 $\mu$m, a porosity of 45%, and a flexural strength of 400 kgf/cm$^2$.

Example 2

The following four components were mixed using a mixing machine and the resulting mixture was extruded into a pipe 20 mm in diameter and 3 mn thick in the same manner as in Example 1.
- 95 parts by weight of white electrofused alumina having a particle size of 1200 mesh and an average particle diameter of 13 $\mu$m.
- 5 parts by weight of aerosil.
- 30 parts by weight of water.
- 12 parts by weight of "Cerander".

The pipe was heated to 1600° C. at a rate of about 5° C./minute and fired at 1600° C. for 1 hour. The fired pipe was allowed to cool to room temperature.

The fired pipe was found to have an average pore diameter of 4.9 $\mu$m, a porosity of 46%, and a flexural strength of 390 kgf/cm$^2$.

Example 3

Fired pipes were prepared in the same manner as in Examples 1 and 2 except that the alumina was replaced by those which have an average particle diameter of 5.3 $\mu$m, 20 $\mu$m, and 40.5 $\mu$m. The fired pipes prepared in Examples 1 to 3 were tested for pore size distribution with a mercury porosimeter. The results are shown in FIG. 3.

Example 4

The following four components were mixed using a mixing machine and the resulting mixture was extruded into a pipe 20 mm in diameter and 3 mm thick.
- 90 parts by weight of white electrofused alumina containing more than 99% of $Al_2O_3$ and having a particle size of 240 mesh and an average particle diameter of 80.5 $\mu$m, made by Nikkei Kako Co., Ltd.
- 10 parts by weight of silica stone powder containing more than 99% of $SiO_2$ and having an average particle diameter of 1 $\mu$m.
- 20 parts by weight of water.
- 12 parts by weight of "Cerander" (binder) made by Yuken Kogyo Co., Ltd.

The pipe was heated to 1600° C. at a rate of about 5° C./minute and fired at 1600° C. for 1 hour. The fired pipe was allowed to cool to room temperature.

The fired pipe was found to have an average pore diameter of 36 μm, a porosity of 45%, and a flexural strength of 450 kgf/cm².

Example 5

The following four components were mixed using a mixing machine and the resulting mixture was extruded into a pipe 20 mm in diameter and 3 mm thick in the same manner as in Example 4.

95 parts by weight of white electrofused alumina having a particle size of 1200 mesh and an average particle diameter of 13 μm.

5 parts by weight of silica stone powder containing more than 99% of $SiO_2$ and having an average particle diameter of 1 μm.

22 parts by weight of water.

12 parts by weight of "Cerander".

The pipe was heated to 1600° C. at a rate of about 5° C./minute and fired at 1600° C. for 1 hour. The fired pipe was allowed to cool to room temperature.

The fired pipe was found to have an average pore diameter of 4.9 μm, a porosity of 46%, and a flexural strength of 450 kgf/cm².

Example 6

Fired pipes were prepared in the same manner as in Examples 4 and 5 except that the alumina was replaced by those which have an average particle diameter of 5.3 μm, 20 μm, and 40 μm. The fired pipes prepared in Examples 4 to 6 were tested for pore size distribution with a mercury porosimeter. The results were similar to those shown in FIG. 3.

What is claimed is:

1. An alumina porous body which consists essentially of coarse alumina particles as a filler and 3–20 wt % $SiO_2$ based on the coarse aluminum particles said alumina and $SiO_2$ forming mullite on the surfaces of the coarse alumina particles through the reaction between the coarse alumina particles and the $SiO_2$ that takes place at the time of firing, said mullite binding said coarse alumina particles, and wherein there are formed pores between the coarse alumina particles.

2. An alumina porous body as claimed in claim 1, wherein said $SiO_2$ is colloidal silica.

3. An alumina porous body as claimed in claim 1, wherein the silica is silica stone powder having an average particle diameter of 1 to 5 μm.

4. An alumina porous body as claimed in claim 1, wherein the coarse alumina particles have an average particle diameter of 3 to 85 μm.

5. An alumina body as claimed in claim 4, wherein the coarse alumina particles have an average particle diameter of 5 to 85 μm.

6. An alumina porous body as claimed in claim 1, which has a porosity of 40 to 45%.

7. A process for producing an alumina porous body which process consists essentially of mixing coarse alumina particles with 3–20 wt % of $SiO_2$ based of the coarse alumina particles, molding the mixture, and firing the molded mixture at a temperature in the range of 1600° C. to 1700° C., whereby mullite is formed on the surface of the coarse alumina particles binding the particles to one another and forming pores between the coarse alumina particles.

8. A process as claimed in claim 7, wherein $SiO_2$ is colloidal silica.

9. A process as claimed in claim 7 wherein the silica is silica stone powder having an average particle diameter of 1 to 5 μm.

10. A process as claimed in claim 7, wherein the coarse alumina particles have an average particle diameter of 3 to 85 μm.

11. A process as claimed in claim 10, wherein the coarse alumina particles have an average particle diameter of 5 to 85 μm.

12. A process as claimed in claim 10, wherein the alumina porous body has a porosity of 40 to 45%.

13. A process as claimed in claim 7, wherein the firing temperature is 1600° to 1650° C.

* * * * *

UNITED STATES PATENT AND TRADEMARK OFFICE
CERTIFICATE OF CORRECTION

PATENT NO. : 4,965,230

DATED : October 23, 1990

INVENTOR(S) : Hirohito Nakajima; Takaaki Ito; Yukio Muraguchi, all of Tokoname, Japan It is certified that error appears in the above-identified patent and that said Letters Patent is hereby corrected as shown below:

Claim 1, column 5, line 36, "particles" should be followed by --,--.

Claim 7, column 6, line 22, "surface" should be --surfaces--.

Signed and Sealed this

Thirty-first Day of March, 1992

Attest:

HARRY F. MANBECK, JR.

Attesting Officer

Commissioner of Patents and Trademarks